United States Patent
Herink

(10) Patent No.: US 12,209,860 B2
(45) Date of Patent: Jan. 28, 2025

(54) METHOD AND DEVICE FOR ANALOG IN SITU LASER PROCESS MONITORING

(71) Applicant: Universitaet Bayreuth, Bayreuth (DE)

(72) Inventor: Georg Herink, Bayreuth (DE)

(73) Assignee: UNIVERSITAET BAYREUTH (DE)

( * ) Notice: Subject to any disclaimer, the term of this patent is extended or adjusted under 35 U.S.C. 154(b) by 937 days.

(21) Appl. No.: 17/291,567

(22) PCT Filed: Nov. 5, 2019

(86) PCT No.: PCT/EP2019/080204
§ 371 (c)(1),
(2) Date: May 5, 2021

(87) PCT Pub. No.: WO2020/094625
PCT Pub. Date: May 14, 2020

(65) Prior Publication Data
US 2021/0396508 A1    Dec. 23, 2021

(30) Foreign Application Priority Data
Nov. 7, 2018 (EP) ..................................... 18204888

(51) Int. Cl.
| | | |
|---|---|---|
| *G01B 9/02001* | (2022.01) | |
| *B23K 26/03* | (2006.01) | |
| *B23K 26/0622* | (2014.01) | |
| *G01B 9/02* | (2022.01) | |

(52) U.S. Cl.
CPC ........ *G01B 9/02014* (2013.01); *B23K 26/032* (2013.01); *B23K 26/0624* (2015.10); *G01B 9/02084* (2013.01)

(58) Field of Classification Search
CPC ......................... B23K 26/032; B23K 26/0624
See application file for complete search history.

(56) References Cited

U.S. PATENT DOCUMENTS

| | | | | |
|---|---|---|---|---|
| 5,646,765 | A * | 7/1997 | Laakmann | G02B 26/101 |
| | | | | 359/201.1 |
| 6,046,764 | A * | 4/2000 | Kirby | G01N 21/8903 |
| | | | | 348/92 |
| 2011/0109911 | A1 | 5/2011 | Podoleanu | 356/451 |
| 2016/0344156 | A1* | 11/2016 | Rothberg | H01S 3/1305 |
| 2017/0067821 | A1 | 3/2017 | Giles et al. | G01N 21/3581 |

(Continued)

FOREIGN PATENT DOCUMENTS

WO    WO-2015021332 A1 *    2/2015    ......... G01B 9/02043

OTHER PUBLICATIONS

International Preliminary Report on Patentability issued in PCT/EP2019/080204, dated May 11, 2021, 11 pages.
(Continued)

*Primary Examiner* — Steven W Crabb
*Assistant Examiner* — Spencer H. Kirkwood
(74) *Attorney, Agent, or Firm* — HAYES SOLOWAY P.C.

(57) ABSTRACT

Disclosed is a method and a device for in situ process monitoring and control down to a single pulse measurement during laser processing, like ablation, laser printing additive manufacturing and modification of refractive index. The disclosure relates to laser material processing and to an integrated process monitoring using interference effects of a laser beam or laser pulse.

15 Claims, 2 Drawing Sheets

(56) References Cited

U.S. PATENT DOCUMENTS

2017/0120377 A1* 5/2017 Webster ............... B22F 10/366

OTHER PUBLICATIONS

International Search Report and Written Opinion issued in PCT/EP2019/080204, dated Jan. 15, 2020, 14 pages.
Mahjoubfar et la., "AI-augmented Time Stretch Microscopy" Progress in Biomedical Optics and Imaging, SPIE-International Society for Optical Engineering, Bellingham, WA, US, vol. 10076, Feb. 22, 2017, DOI: 10.1117/12.2252572, 7 pages.
Goda et al: "Hybrid Dispersion Laser Scanner", Scientific Reports, vol. 2, Jun. 8, 2012, DOI; 10.1038/srep00445, 8 pages.
Lau Andy K S et al: "Interferometric time-stretch microscopy for ultrafast quantitative cellular and tissue imaging at 1 μm", Journal of Biomedical Optics, SPIE, vol. 19, No. 7, Jul. 1, 2014, DOI: 10.1117/1.JBO.19.7.076001, 8 pages.

* cited by examiner

METHOD AND DEVICE FOR ANALOG IN SITU LASER PROCESS MONITORING

This invention relates to a method and a device for fast process monitoring by a pulse laser utilizing single pulse measurements at high repetition rates. It allows in situ process monitoring and control down to a single pulse measurement at high repetition rates during in situ inspection and/or detection by a laser.

FIELD OF THE INVENTION

The application relates to in situ inspection and/or detection by a laser and to an integrated process monitoring using spectral interference effects in a laser pulse.

BACKGROUND OF THE INVENTION

Since the invention of light amplification by stimulated emission of radiation, "laser" for short, numerous applications from measuring to processing have been developed. The physical nature of laser light enables along with measurement methods of interferometry very precise analysis and processing. With the help of very short and broadband light pulses of ultrashort pulse lasers it is possible to perform spectral interference measurements. This allows detecting very fast processes, among other things.

US 2017/0120377 discloses methods and systems for coherent imaging and feedback control for modification of materials using the so-called "spectral domain optical coherence tomography" (SDOCT). A laser beam processes a specimen to be ablated and subsequently passes an interferometric element, which is a Michelson interferometer, to produce an interference pattern by means of an additional imaging light beam. A high-speed CMOS spectrometer converts the resulting interference pattern to a digital signal which is analyzed by a computing device, called feedback controller, generating an output signal. This output signal finally controls or at least influences the process or processing parameters, respectively, based on the interferometry output.

The disadvantage of this method is that the sampling rate is only in the range of a few hundred kilohertz. Two factors limit the maximum sampling rate. First, the maximum image reading sample rate of the high-speed CMOS sensor is about 300 kHz. Furthermore, the speed of the feedback controller is limited on the one hand by the CPU clock rate and on the other hand by the complexity of the implemented controlling program and is in the range of some hundred kilohertz. Moreover, a second light source in addition to the processing laser is used increasing the costs and the complexity of the technical set-up.

US 2017/0067821 discloses a single-shot terahertz imaging system comprising an interferometer and a terahertz spectrometer configured to measure the interfered terahertz radiation by a CCD camera. The terahertz spectrometer includes a frequency dispersive element configured to receive the interfered terahertz radiation and output spatially dispersed terahertz radiation and a terahertz radiation detector configured to determine the intensity of the spatially dispersed terahertz radiation. This system enables a measurement of three-dimensional topography of sample surfaces.

A disadvantage of this measuring device is the limitation of the measuring rate due to the use of a CCD camera. Thus, there is a need for avoiding speed limitations by the digital signal processing of the CCD camera and additionally lowering the machine costs and increasing the quality and accuracy of pulse laser-based material processing to make it more profitable.

Mahjoubfar Ata et al: "AI-augmented time stretch microscopy", Progress in Biomedical Optics and Imaging, SPIE-International Society for Optical Engineering, Bellingham, WA, US, vol. 10076, 22 Feb. 2017 (2017-02-22), pages 100760J-100760J, DOI: 10.1117/12.2252572 describes a scientific measuring method and device for high-speed imaging with spatial resolution in the form of a line scan. The usage of the method of time-stretched dispersive Fourier transform enables the digitization of the measuring data for subsequent computational data analysis based on artificial intelligence.

K. Goda et al: "Hybrid Dispersion Laser Scanner", Scientific Reports, vol. 2, 8 Jun. 2012 (2012-06-08), DOI: 10.1038/srep00445 involves a hybrid dispersion laser scanner, which comprises a 2D scanner for spatial resolution without any mechanical components. The measuring device uses an ultrashort pulse laser and the time-stretched dispersive Fourier transform for digitization of the measuring data. The data analysis is performed by computational software.

US 2011/109911 A1 describes a device for carrying out the method called optical coherence tomography (OCT) with usage of a non-coherent light source. The usage of fiber loops extends the measuring range. The measuring signal is recorded by CCD chips.

Lau Andy K S et al: "Interferometric time-stretch microscopy for ultrafast quantitative cellular and tissue imaging at 1 m", Journal of Biomedical Optics, SPIE, vol. 19, no. 7, 1 Jul. 2014 (2014-07-01), pages 76001, DOI: 10.1117/1.JBO.19.7.076001 describes a 1D imaging method with the usage of an ultrashort pulse laser and the time-stretched dispersive Fourier transform for a fast measuring data recording. The laser beam is widened by a diffraction gratin to scan a 1D line through a microscopic assembly.

The disadvantage of all mentioned methods and devices is the fact, that no real-time answers of the signals are possible because of the required cumbersome computational data analysis. Furthermore, no continuous operation is possible due to the physically limited computer memory for the measuring data. And finally, all described methods and devices are made for measuring. A processing is physically not possible due to the revealed assemblies.

SUMMARY OF THE INVENTION

The object of this present invention is a new processing and measurement method to increase the detection speed, and thus to open up new processing opportunities such as higher processing accuracy because of higher processing time resolution and faster processing time of more complex three-dimensional structures. It allows for higher clock rates and avoids speed limitation by digital signal analysis.

Processing the electrical signal in the analog electric domain is a key point of the invention. Other implementations apply fast analog-digital conversion of the electric signal which is always limited by the clock speed of the used processor. Here, the signal of interest is directly detected using filters, e.g. radio frequency filters, and rectification.

Key step of the invention is the so-called time-stretch dispersive Fourier transform (TS-DFT) that allows for operating in the time domain in contrast to the cited methods and devices which operate after mapping frequencies to positions, for instance via angular dispersion, with spatial images instead of temporal electrical signals (frequencies). In the present invention two ultrashort pulse laser beams interfere with each other during passing a dispersive element resulting in one interference beam. A temporal interferogram, e.g. spectral interference mapped into a stretched time-domain, is the resulting optical signal. The temporal modulation frequency of the optical signal is measured by a photodetector and converted into an electrical signal. The temporal modulation frequency of the interference beam and the electrical signal correlates with T, respectively:

$$f_R = \frac{\tau}{2 \cdot \pi \cdot \beta \cdot L}$$

The variable $\tau$ represents the time difference between two ultrashort pulses. L and $\beta$ are the length and the dispersion parameter of the used dispersive element, respectively. Such a dispersive element could be a fiber, for instance. With the aid of an interferometric setup, like a Michelson interferometer, for instance, two pulses are generated from one pulse of a pulse beam whose time difference depends, inter alia, on the distance from the beam splitter to the target object in comparison to the corresponding distance in the reference arm. The time difference may also occur as consequence of a transmission through the target object with different optical densities, also physically described as refractive indices, which results in different propagation speeds of light.

Each distance difference or refractive index difference and consequently each time difference $\tau$ results in a characteristic radio frequency signal that is generated by the photodetector. Filtering this signal to a calculated characteristic frequency $f_{R,calc}$ with the knowledge of the target value in form of a specific distance to the target object or a specific refractive index of the target object in comparison to the distance to the reference mirror allows controlling the ultrashort pulse laser, for instance, whose beam is used simultaneously for processing and measuring. A radio frequency filter is configured to receive a threshold frequency by a user or a controlling element wherein the threshold frequency may correspond to a specific difference in the pathlength of the two arms that in turn may correspond to a certain predefined processing state of the target object. Thus, the radio frequency filter may control the processing laser by generating a signal to stop the process if the threshold frequency is reached.

The advantage of the present invention is that an ultrashort pulse laser beam is split into a processing beam and a measuring beam which allows instantaneous process monitoring and thus very fast processing with high precision of depth information in the submicrometer range, e.g. smaller than 10 µm, or with high precision of refractive density information of the target object.

The present invention considers a method for in situ process monitoring during laser processing comprising at least the steps of emitting at least one ultrashort pulse laser beam by an ultrashort pulse laser, splitting the at least one ultrashort pulse laser beam by a beam splitter into at least one main pulse laser beam and at least one reference pulse laser beam, reflecting or transmitting said at least one main pulse laser beam by a target object and reflecting said at least one reference pulse laser beam by a reference mirror, providing at least one combined pulse laser beam by superposing the at least one reflected or transmitted main pulse laser beam and the at least one reflected reference pulse laser beam, coupling the at least one combined pulse laser beam into a dispersive element, interfering the at least one combined pulse laser beam with itself due to temporally stretching the frequency content by the dispersive element, converting at least one interference beam to an electrical signal whereby the at least one interference beam is a result and an emission of the dispersive element with inversely proportional amplitude/intensity modulation of the spectrum and respective temporal waveform after time-stretch in the dispersive element to the time delay between the at least one reflected or transmitted main pulse laser beam and the at least one reflected reference pulse laser beam, filtering a specific frequency and/or a specific range of frequencies of the electrical signal and rectifying the filtered electrical signal to an output signal for control functions and/or as measurand.

Bandpass filters can be used as filters, which can filter out a specific range of frequencies. Another advantageous embodiment allows filters to pass only one specific radio frequency.

In addition, the dispersive element can be a spectrally dispersive element which can be used for spectral interferometry due to spectral interference effects.

Furthermore, the presented method works with only one main pulse laser beam and does not require several for processing and measuring.

It is not absolutely necessary that the at least one main pulse laser beam is only reflected by a target object. It is also possible, as already mentioned, that the at least one main pulse laser beam transmits through a (semi-)transparent object so that differences in the refractive index or differences in thickness can be measured.

In a present embodiment of the invention the splitter axis of the beam splitter is inclined by 45° relative to the incident at least one ultrashort pulse laser beam.

In a present embodiment of the invention the at least one main pulse laser beam and the at least one reference pulse laser beam are essentially perpendicular to each other.

In a present embodiment of the invention the at least one reference pulse laser beam is reflected in an essentially perpendicular direction by the reference mirror.

In a further embodiment of the invention the at least one ultrashort pulse laser beam contains at least one processing pulse and at least one detection pulse which are alternately used. Processing and detection pulses can contain different energies, such as high- and low-energy pulses. Different central frequencies are also possible. The processing pulses may operate in the UV range and the detection pulses in the near-infrared range. Both pulses or beams can be split and superposed by dichroic beam splitters, for instance.

In a present embodiment of the invention the at least one processing pulse is used for processing applications and the at least one detection pulse is used for measurement.

Such processing applications in connection with this invention mean, inter alia, drilling, cutting, ablation, melting, hardening, printing in the way of additive manufacturing and surface modification, like refractive index modification, for instance. The measurement comprises measuring or detecting, inter alia, distances, the refractive index of (semi-)transparent surfaces or objects. The term processing is not to be understood in the sense of material removal. Adaptive laser surgery or few-shot processing of sensitive media is also a possible processing application.

In a present embodiment of the invention the at least one processing pulse and the at least one detection pulse are polarized differently.

In a present embodiment of the invention the at least one reflected reference pulse laser beam and the at least one reflected or transmitted main pulse laser beam are superposed by passing the beam splitter.

In a present embodiment of the invention the ultrashort pulse laser provides pulses with pulse intervals that are longer than the duration of the stretched measured signal in the form of a pulse of the interference beam and/or equidistant pulses.

Any other form of pulse sequence is possible, too.

In a present embodiment of the invention the ultrashort pulse laser provides pulse with pulse durations in the range of a few nanoseconds down to femtoseconds.

In a further embodiment of the invention the at least one processing pulse is polarized after leaving the ultrashort pulse laser and is filtered out by a filtering element before entering the dispersive element.

A technical implementation to the method is a device comprising at least a material processing unit, a measurement unit and a control unit.

The present invention also refers to a device for processing and in situ process monitoring comprising an ultrashort pulse laser which is configured for emitting at least one ultrashort pulse laser beam, a beam splitter which is configured for splitting the at least one ultrashort pulse laser beam into at least one main pulse laser beam and at least one reference pulse laser beam, a target object to be processed by the at least one main pulse laser beam and partly reflecting or transmitting the main pulse laser beam to the beam splitter, a reference mirror which is configured for reflecting the at least one reference pulse laser beam to the beam splitter and superposing the at least one reflected or transmitted main pulse laser beam and the at least one reflected reference pulse laser beam to at least one combined pulse laser beam, a dispersive element which is configured for being passed through by the at least one combined pulse laser beam and for providing at least one interference beam with an amplitude/intensity modulation inversely proportional to the time delay between the pulses of the at least one reflected or transmitted main pulse laser beam and the at least one reflected reference pulse laser beam, a detecting element, e.g. a photodetector, which is configured for converting the at least one interference beam into an electrical signal representing the time-stretched intensity envelope of the spectral interferogram, a frequency filter which is configured for filtering a specific frequency and/or a specific range of frequencies of the electrical signal, and a rectifier which is configured for rectifying the filtered electrical signal to an output signal for control functions and/or as measurand.

To get a clear and manageable output signal a signal amplifier can be arranged after the detecting element and/or the filtering element and/or the rectifier.

It is also possible to amplify the optical signal before its conversion by means of a fiber amplifier, like an Erbium Doped Fiber Amplifier which is pumped by a laser, or a Raman amplification inside of the dispersive element, for instance.

In a further embodiment of the invention the ultrashort pulse laser is a femtosecond laser, a picosecond laser or a nanosecond laser.

In a present embodiment of the invention the ultrashort pulse laser comprises an electronic shutter and/or an aperture which controls the intensity of the emitted ultrashort pulse laser beam and/or the ultrashort pulse laser is followed by a polarizer and/or an optical isolator. Such an electronic shutter can be an acousto-optic or electro-optic modulator or shutter, for instance. In an advantageous embodiment of the invention the aperture is an electrically-driven aperture.

In a present embodiment of the invention the reference mirror is configured for reflecting the at least one reference pulse laser beam essentially perpendicularly to the beam splitter. The beam splitter superposes the at least one reflected or transmitted main pulse laser beam and the at least one reflected reference pulse laser beam to at least one combined pulse laser beam.

In a further embodiment of the invention the dispersive element is a spectrally dispersive element.

In a further embodiment of the invention the detecting element is a photodetector.

The device further could comprise an amplifier which is configured for amplifying the interference beam and/or the filtered electrical signal.

The presented embodiment of the invention can also be realized in the sense of a miniaturization as a fiber-optic system with integrated optical elements, like beam splitters, beam couplers, chirped fiber bragg gratings as dispersive elements, circulators, faraday mirrors, optical isolators, fiber optic retroreflectors, polarizers, multimode lensed fibers etc. Such devices are also known as integrated optics or photonic integrated circuit. Moreover, such a fiber-optic system is rather resistant to mechanical perturbations of the optomechanic setup, which is highly relevant regarding harsh industrial environments.

It is advantageous to use standard components. In addition, further realizations of the dispersion are also possible in the form of embodiments with virtually imaged phased arrays, VIPA for short, diffraction gratings, mode-dispersion in multimode-fibers, prisms and combinations thereof.

Other features of the invention will become apparent to those skilled in the art from the following detailed description of embodiments and its accompanying drawings.

BRIEF DESCRIPTION OF THE DRAWING

Embodiments of the invention are described and shown by way of examples and with reference to the accompanying drawings in which.

DETAILED DESCRIPTION

Figure 1:
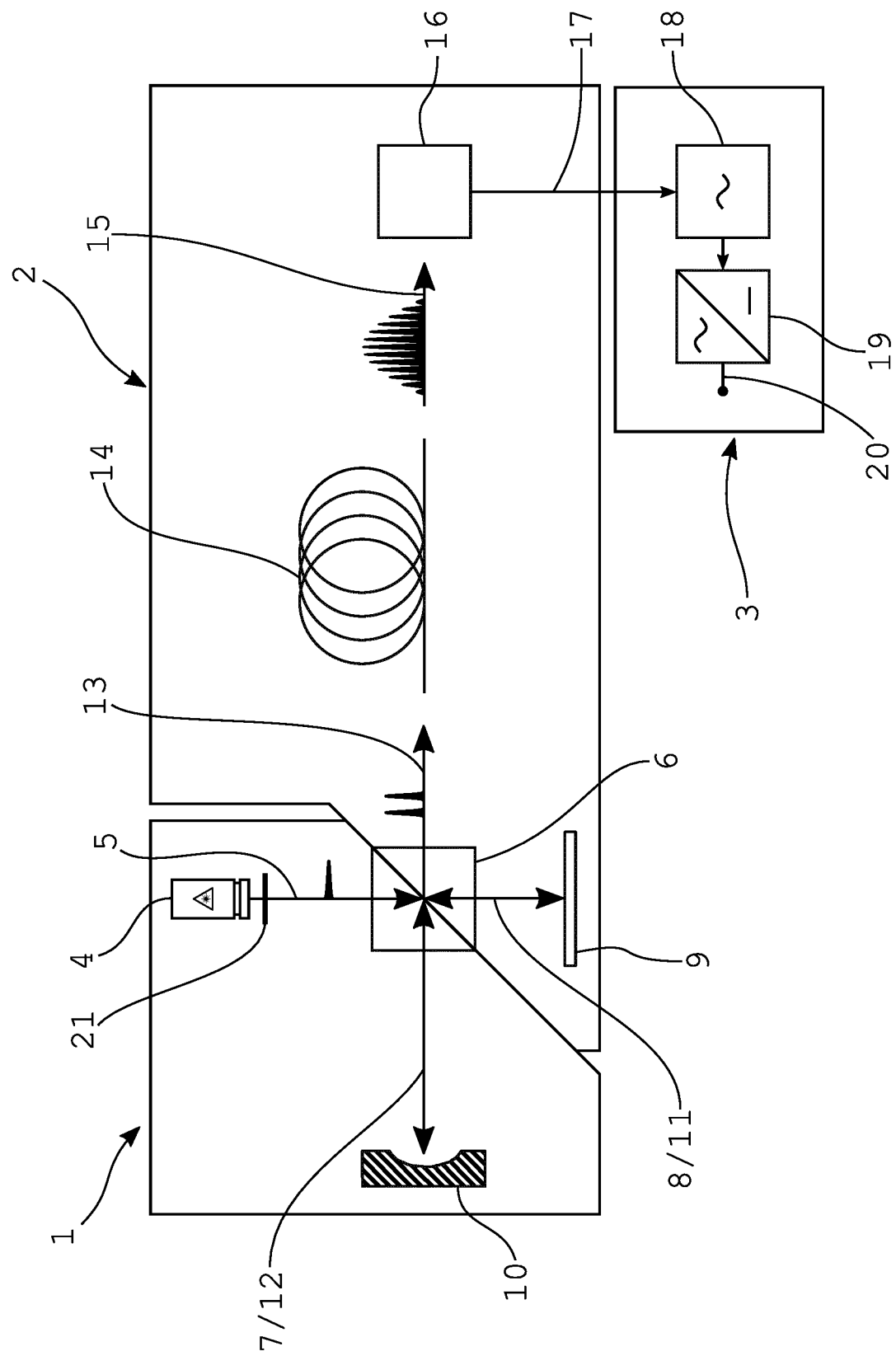
FIG. 1 is a simplified schematic illustration of elements for the realization of the method for in situ process monitoring during laser processing and/or ablation and FIG. 2 shows a series of optical time-stretched interferograms with a related series of spectrograms representing the measured frequencies.

FIG. 1 provides the overall operation of the present invention and shows the key elements for the realization of the method for in situ process monitoring during laser processing and/or ablation. A technical implementation of this method is also shown.

In principle the entire application comprises three parts: a material processing unit 1, a measurement unit 2 and a control unit 3.

The material processing unit 1 provides the operating beam that processes the target object 10. The ultrashort pulse laser beam 5 is emitted by an ultrashort pulse laser 4.

The ultrashort pulse laser 4 may emit pulses with pulse intervals being longer than the duration of the stretched measured signal of the interference beam 15. In this case the pulse intervals are in the range of about 1-20 ns.

In a further embodiment the ultrashort pulse laser 4 emits equidistant laser pulses.

In an advantageous application the pulse duration is in the range of a few nanoseconds down to femtoseconds and the pulse frequency is in the range of 0.5 to 100 MHz.

Additionally, the device comprises an optical isolator (not shown) arranged between the ultrashort pulse laser 4 and the beam splitter 6 to protect the ultrashort pulse laser 4 from reflected laser light, which is able to destroy the ultrashort pulse laser 4.

Another advantageous embodiment of the device includes an electronic shutter 21 arranged between the ultrashort pulse laser 4 and the beam splitter 6 to block or let pass the ultrashort pulse laser beam 5 depending on the control.

An additional embodiment may contain a polarizer (not shown) between the ultrashort pulse laser 4 and the beam splitter 6 to polarize the ultrashort pulse laser beam 5. Typically, all such lasers already emit polarized light.

The beam splitter is configured to split the ultrashort pulse laser beam 5 into two laser beams: a main pulse laser beam 7 and a reference pulse laser beam 8. The split axis is inclined by 45° relative to the incident ultrashort pulse laser beam 5 with the effect that one beam is deflected perpendicularly, the ablating main pulse laser beam 7 in this case. The ablating process takes place with impinging of the main pulse laser beam 7 on the surface of the target object 10.

An advantageous embodiment of the invention comprises a beam splitter 6 with a 50:50 split ratio, preferably a 90:10 split ratio is used. The higher the split ratio, the higher the efficiency of the processing and/or ablation process because more energy is admitted to the target object 10 by the main pulse laser beam 7.

The next part is the measurement unit 2, which by definition also includes the splitting of the ultrashort pulse laser beam 5 and overlaps with the material processing unit 1. Both partial beams are at least partly reflected by the target object 10 and the reference mirror 9, respectively, resulting in a reflected main pulse laser beam 12 and a reflected reference pulse laser beam 11. The reflected main pulse laser beam 12 and the reflected reference pulse laser beam 11 are superposed at the beam splitter 6 to one combined pulse laser beam 13 with the same beam direction as the reflected main pulse laser beam 12.

The combined pulse laser beam 13 contains pulses with a time difference that depends on the distance difference between target object 10—beam splitter 6 and reference mirror 9—beam splitter 6. In this context, the larger the distance difference, the larger the time difference.

Hereafter, the combined pulse laser beam 13 enters a dispersive element 14, such as an optical fiber with high group-velocity dispersion. During passing the dispersive element 14 the respective optical frequencies of the combined pulse laser beam 13 interfere with each other. More precisely, the reflected pulses of the reflected main pulse laser beam 12 and the reflected reference pulse laser beam 11 are superposed resulting in an interference beam 15. The temporal modulation frequency of the interference beam 15 is inversely proportional to the time difference of the pulses between the reflected main pulse laser beam 12 and the reflected reference pulse laser beam 11. In this context, the higher the frequency of the interference beam 15, the larger the distance difference and the time difference, respectively, between target object 10 and reference mirror 9 relative to the beam splitter 6. The special case of equal distances produces the frequency of zero, because of the fact that there are no distance difference and thus no time difference, respectively. In other words, no time difference and thus, no frequency signal is obtained.

The modulation frequency of the interference beam 15 is measured by a photodetector 16. The opto-electronic conversion by the photodetector 16 creates an electrical signal 17 with a radio frequency modulation equivalent to the intensity modulation of the interference beam 15.

Subsequently, the electrical signal 17 passes a frequency filter 18 which is modifiable in terms of its transmission frequency. The frequency of the interference beam 15 and the electrical signal 17 of the photodetector 16, respectively, correlate with $$f_R = \frac{\tau}{2 \cdot \pi \cdot \beta \cdot L}$$

to $\tau$, where $\tau$ represents the time difference between two ultrashort pulses of the combined pulse laser beam 13. L and $\beta$ are the length and the dispersion parameters of the used dispersive element 14, respectively. With the knowledge of these parameters and the processing depth to be achieved by the main pulse laser beam 7 processing the target object 10 a target frequency can be calculated.

It is necessary to know the speed of light for calculation the theoretical time difference $\tau$ which two pulses in the combined pulse laser beam 13 must have to achieve a certain processing depth by the main pulse laser beam 7.

If the target frequency of the electrical signal 17 is achieved, it will pass the frequency filter 18 and be rectified by a rectifier 19 that is configured to generate an output signal 20. The output signal 20 is able to control processing parameters, like the intensity of the ultrashort pulse laser 4 or the position of the target object 10, for instance.

In an additional arrangement of the embodiment the processing device comprising at least the material processing unit 1 and the measurement unit 2 is moved instead of the fixed target object 10.

In another advantageous embodiment the ultrashort pulse laser 4 is switched off when the distance between target object 10—beam splitter 6 and reference mirror 9—beam splitter 6 is the same or reaches a predetermined distance and corresponding frequency.

Figure 2:
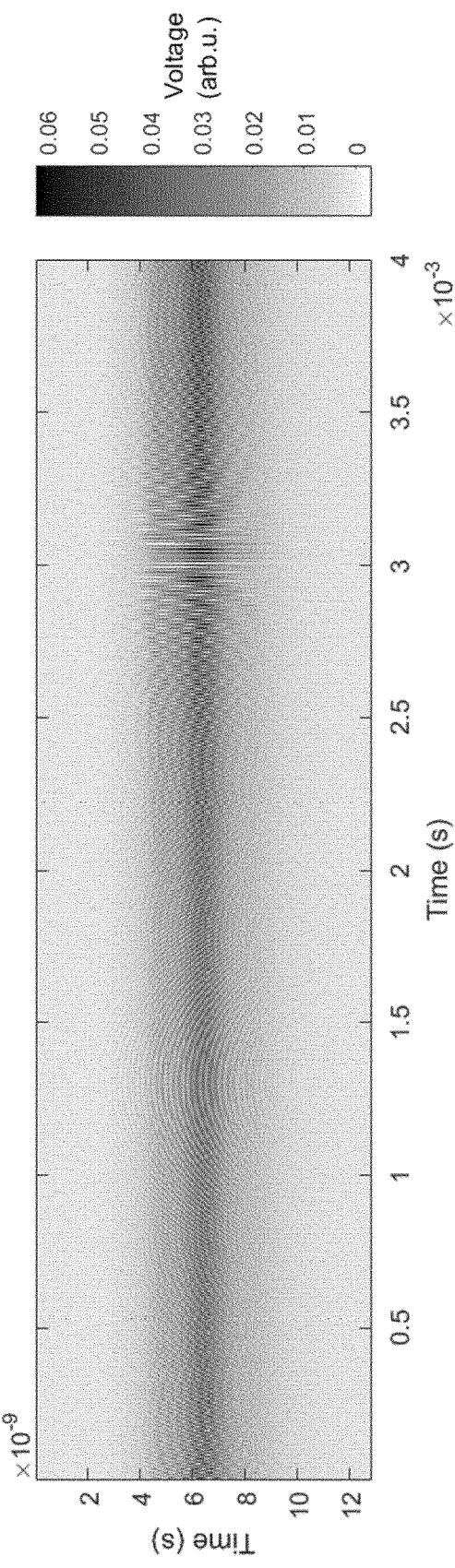
Figure 2:
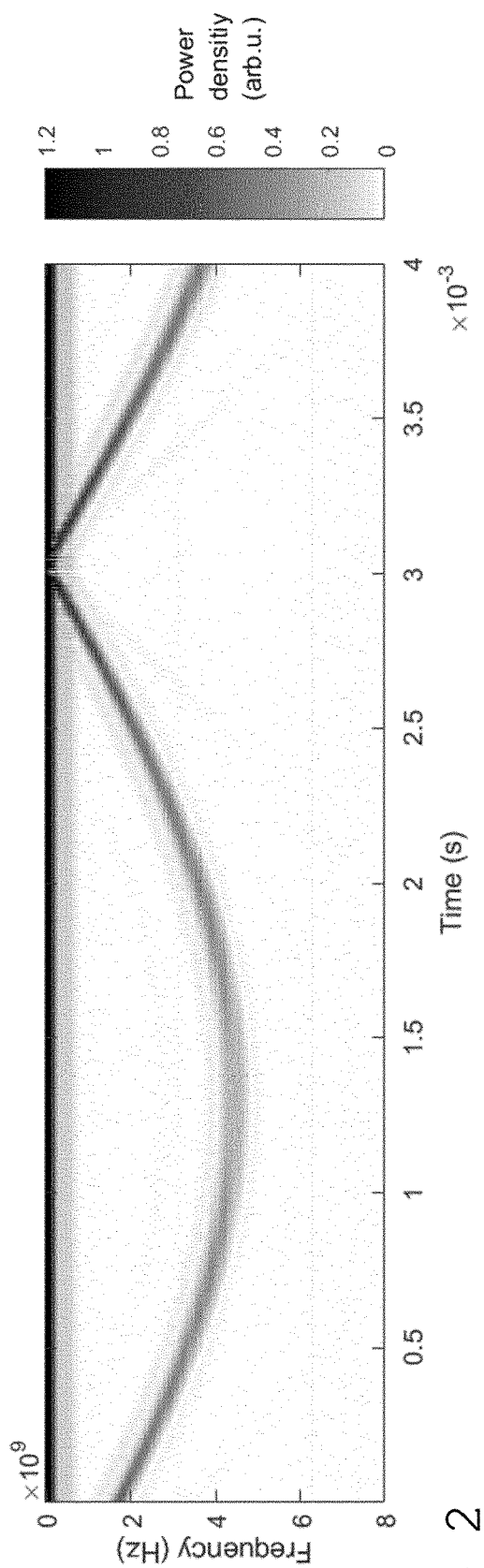

FIG. 2 shows consecutive interferograms over time of an interference beam with the related spectrogram of the measured frequencies. Each interferogram is drawn along the vertical axis and the series is drawn along the horizontal axis. The interferograms represent the measuring results of an experimental set-up according to the method and the device of the present invention with a vibrating mirror on a voice-coil actuator as target object 10. The data is recorded directly from the photodetector 16 by a fast real-time oscilloscope.

The upper diagram shows the interference pattern of a measured combined pulse laser beam 13 after leaving the dispersive element 14 while the target object that is a mirror 10 is vibrating.

The lower diagram shows the frequency spectrum of the upper interference pattern calculated by a numerical Fourier transform. Each frequency represents one specific distance difference between target object 10—beam splitter 6 and reference mirror 9—beam splitter 6. The vibrations cause distance changes that represent a possible theoretical ablation on a target object 10.

The course of the side lobes encodes the current position of the mirror as target object 10. Specific positions can be selected by means of a frequency filter.

LIST OF REFERENCE SIGNS 1 material processing unit
2 measurement unit
3 control unit
4 ultrashort pulse laser
5 ultrashort pulse laser beam
6 beam splitter
7 main pulse laser beam
8 reference pulse laser beam
9 reference mirror
10 target object
11 reflected reference pulse laser beam
12 reflected main pulse laser beam
13 combined pulse laser beam
14 dispersive element
15 interference beam
16 photodetector
17 electrical signal
18 frequency filter
19 rectifier
20 output signal
21 electronic shutter

We claim:

1. A method for in situ process monitoring during laser processing comprising at least the steps of:
   a. emitting at least one ultrashort pulse laser beam by an ultrashort pulse laser;
   b. splitting the at least one ultrashort pulse laser beam by a beam splitter into at least one main pulse laser beam and at least one reference pulse laser beam;
   c. reflecting or transmitting said at least one main pulse laser beam by a target object and reflecting said at least one reference pulse laser beam by a reference mirror;
   d. providing at least one combined pulse laser beam by superposing the at least one reflected or transmitted main pulse laser beam and the at least one reflected reference pulse laser beam;
   e. coupling the at least one combined pulse laser beam into a dispersive element;
   f. interfering the at least one combined pulse laser beam with itself due to temporally stretching the frequency content by the dispersive element;
   g. converting at least one interference beam to an electrical signal,
   whereby the at least one interference beam is a result and an emission of the dispersive element with inversely proportional amplitude/intensity modulation of the spectrum and respective temporal waveform after time-stretch in the dispersive element to the time delay between the at least one reflected or transmitted main pulse laser beam and the at least one reflected reference pulse laser beam;
   h. filtering a specific frequency and/or a specific range of frequencies of the electrical signal; and
   i. rectifying the filtered electrical signal to an output signal for control functions and as measurand;
   wherein the electrical signal is processed in an analog electric domain.

2. The method according to claim 1, characterized in that the splitter axis of the beam splitter is inclined by 45° relative to the incident at least one ultrashort pulse laser beam.

3. The method according to claim 1, wherein the at least one main pulse laser beam and the at least one reference pulse laser beam are essentially perpendicular to each other.

4. The method according to claim 1, wherein the at least one reference pulse laser beam is reflected in an essentially perpendicular direction by the reference mirror.

5. The method according to claim 1, wherein the at least one ultrashort pulse laser beam contains at least one processing pulse and at least one detection pulse which are alternately used.

6. The method according to claim 1, wherein the at least one reflected reference pulse laser beam and the at least one reflected or transmitted main pulse laser beam are superposed by passing the beam splitter.

7. The method according to claim 1, wherein the ultrashort pulse laser provides pulses with pulse intervals that are longer than the duration of the stretched measured signal in the form of a pulse of the interference beam and equidistant pulses.

8. The method according to claim 1, wherein the ultrashort pulse laser provides pulses with pulse durations in the range of a few nanoseconds down to femtoseconds.

9. A device for carrying out the method according to claim 1 comprising at least a material processing unit, a measurement unit and a control unit.

10. The method according to claim 5, wherein the at least one processing pulse is used for processing applications and the at least one detection pulse is used for measurement.

11. The method according to claim 10, wherein the at least one processing pulse and the at least one detection pulse are polarized differently.

12. The method according to claim 7, wherein the at least one processing pulse is polarized after leaving the ultrashort pulse laser and is filtered out by a filtering element before entering the dispersive element.

13. A device for processing and in situ process monitoring comprising:
   a. an ultrashort pulse laser which is configured for emitting at least one ultrashort pulse laser beam;
   b. a beam splitter which is configured for splitting the at least one ultrashort pulse laser beam into at least one main pulse laser beam and at least one reference pulse laser beam;
   c. a target object to be processed by the at least one main pulse laser beam and partly reflecting or transmitting the main pulse laser beam to the beam splitter and
   d. a reference mirror which is configured for reflecting the at least one reference pulse laser beam to the beam splitter and superposing the at least one reflected or transmitted main pulse laser beam and the at least one reflected reference pulse laser beam to at least one combined pulse laser beam;
   e. a dispersive element which is configured for being passed through by the at least one combined pulse laser beam and for providing at least one interference beam with an amplitude/intensity modulation inversely proportional to the time delay between the at least one reflected or transmitted main pulse laser beam and the at least one reflected reference pulse laser beam;
   f. a detecting element which is configured for converting the at least one interference beam into an electrical signal;
   g. a frequency filter which is configured for filtering a specific frequency and a specific range of frequencies of the electrical signal; and
   h. a rectifier which is configured for rectifying the filtered electrical signal to an output signal for control functions and/or as measurand;
   wherein the electrical signal is processed in an analog electric domain.

14. The device according to claim 13, wherein the ultrashort pulse laser is a femtosecond laser, a picosecond laser or a nanosecond laser, and wherein the ultrashort pulse laser comprises an electronic shutter and an aperture configured to control the intensity of the emitted ultrashort pulse laser beam, and the ultrashort pulse laser is followed by a polarizer and/or an optical isolator.

15. The device according to claim 13, wherein the reference mirror is configured for reflecting the at least one reference pulse laser beam essentially perpendicularly to the beam splitter and/or wherein the dispersive element is a spectrally dispersive element, and characterized in that the detecting element is a photodetector, and wherein the device further comprises an amplifier which is configured for amplifying the interference beam and the filtered electrical signal.

\* \* \* \* \*